US010986570B1

(12) United States Patent
Menon et al.

(10) Patent No.: US 10,986,570 B1
(45) Date of Patent: Apr. 20, 2021

(54) LOCATION-BASED ADAPTATION OF WIRELESS COMMUNICATION DEVICE OPERATING PARAMETERS

(71) Applicant: AT&T Intellectual Property I, L.P., Atlanta, GA (US)

(72) Inventors: Sreejith Menon, Herndon, VA (US); Mario Manuel Jardon, Pembroke Pines, FL (US); William Harry Rosenberg, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/870,164

(22) Filed: May 8, 2020

(51) Int. Cl.
| | | |
|---|---|---|
| *H04W 48/18* | (2009.01) | |
| *H04W 48/16* | (2009.01) | |
| *H04W 88/06* | (2009.01) | |
| *H04W 84/04* | (2009.01) | |
| *H04W 8/18* | (2009.01) | |
| *H04W 8/02* | (2009.01) | |
| *H04W 8/26* | (2009.01) | |
| *H04W 16/14* | (2009.01) | |

(52) U.S. Cl.
CPC ............ *H04W 48/18* (2013.01); *H04W 8/02* (2013.01); *H04W 8/183* (2013.01); *H04W 8/26* (2013.01); *H04W 16/14* (2013.01); *H04W 48/16* (2013.01); *H04W 84/042* (2013.01); *H04W 88/06* (2013.01)

(58) Field of Classification Search
CPC ....... H04W 48/18; H04W 8/02; H04W 8/183; H04W 8/26; H04W 16/14; H04W 48/16; H04W 84/042; H04W 88/06
See application file for complete search history.

(56) References Cited

U.S. PATENT DOCUMENTS

| | | | |
|---|---|---|---|
| 10,638,253 B1* | 4/2020 | Parkvall | H04L 5/0053 |
| 2014/0051422 A1* | 2/2014 | Mittal | H04W 8/18 |
| | | | 455/419 |
| 2014/0206314 A1* | 7/2014 | Abdallas | H04W 4/70 |
| | | | 455/411 |
| 2017/0005914 A1* | 1/2017 | Edge | H04W 4/90 |
| 2019/0223079 A1* | 7/2019 | Sabeur | H04W 48/16 |

* cited by examiner

*Primary Examiner* — Charles N Appiah
*Assistant Examiner* — Frank E Donado
(74) *Attorney, Agent, or Firm* — Guntin & Gust, PLC; Mark Wilinski

(57) ABSTRACT

Aspects of the subject disclosure may include, for example, identifying a local mobile country code (MCC) for a wireless communication device, accessing a home MCC list for the wireless communication device, and determining whether the local MCC for the wireless communication device matches any home MCC comprised in the home MCC list for the wireless communication device. In various embodiments, an operating parameter of the wireless communication device may be modified responsive to a determination that the local MCC for the wireless communication device does not match any home MCC comprised in the home MCC list for the wireless communication device. Other embodiments are disclosed.

15 Claims, 9 Drawing Sheets

US 10,986,570 B1

LOCATION-BASED ADAPTATION OF WIRELESS COMMUNICATION DEVICE OPERATING PARAMETERS

FIELD OF THE DISCLOSURE

The subject disclosure relates to location-based adaptation of wireless communication device operating parameters.

BACKGROUND

Various aspects of features and services of a wireless communication device can be affected by rules and regulations that apply in the country within which that device operates. From country to country, such rules and regulations may differ, such that a device that travels outside of its home country may be subject to requirements that differ from those to which it is subject while operating within its home country. Some device operations may potentially violate local requirements if they are performed in the same manner in a visited country as they are performed in the device's home country.

BRIEF DESCRIPTION OF THE DRAWINGS

Reference will now be made to the accompanying drawings, which are not necessarily drawn to scale, and wherein.

DETAILED DESCRIPTION

Figure 1:
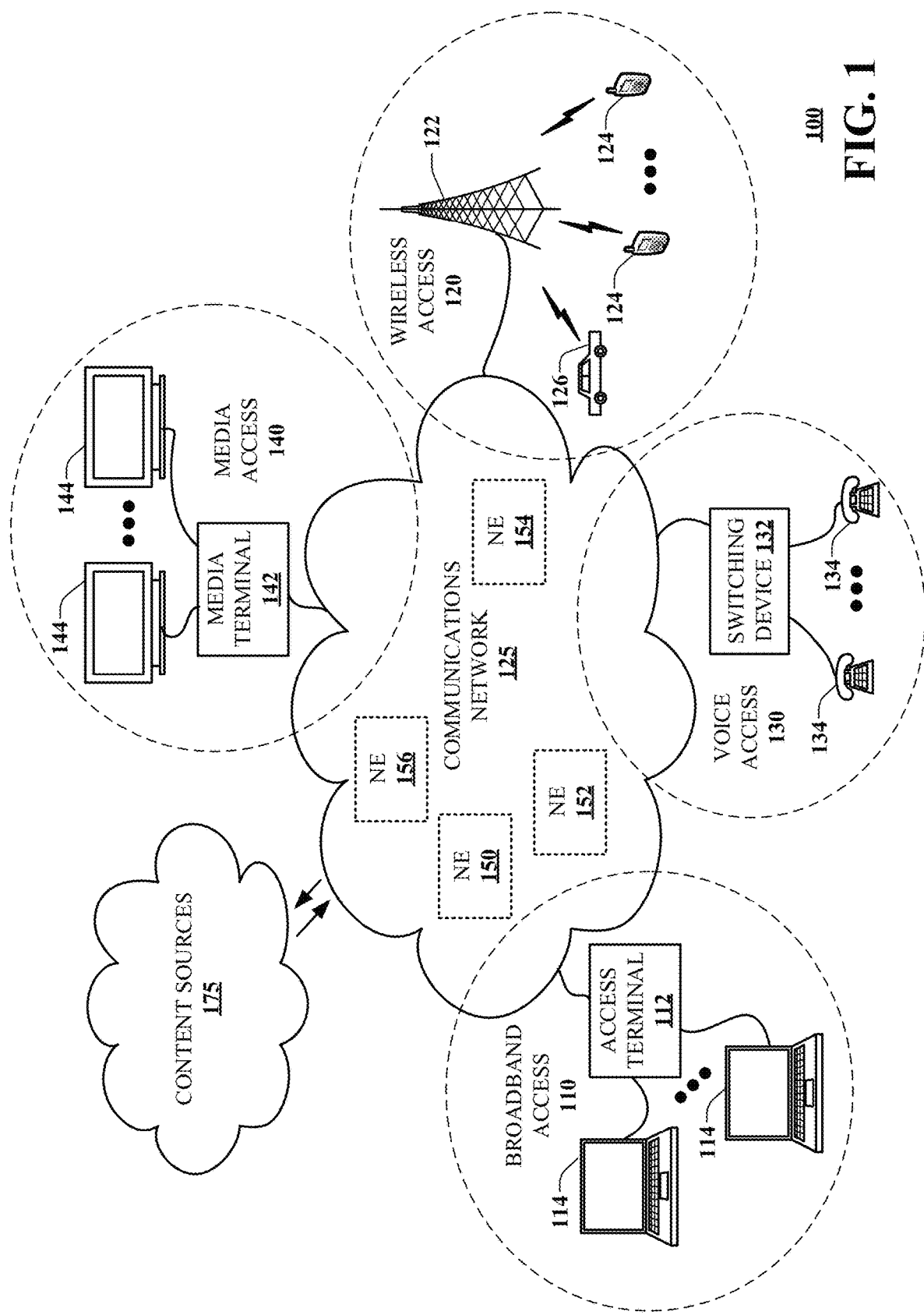
FIG. 1 is a block diagram illustrating an exemplary, non-limiting embodiment of a communications network in accordance with various aspects described herein.

The subject disclosure describes, among other things, illustrative embodiments for location-based adaptation of wireless communication device operating parameters. According to techniques described herein, operating parameters of a wireless communication device can be modified based on the identity of a country or other regulatory area in which the wireless communication device is located. Some embodiments can include identifying a mobile country code (MCC) associated with a current position of a wireless communication device (a "local MCC" for the wireless communication device), and determining whether that local MCC matches a home MCC of the wireless communication device. In various embodiments, the wireless communication device may have multiple home MCCs, and it may be determined whether the local MCC matches any of the home MCCs. Some embodiments can include modifying an operating parameter of the wireless communication device responsive to a determination that the local MCC does not match any home MCC of the wireless communication device. Other embodiments are described in the subject disclosure.

One or more aspects of the subject disclosure include an apparatus comprising a processing system including a processor and a memory that stores executable instructions that, when executed by the processing system, facilitate performance of operations. The operations can include identifying a local MCC for a wireless communication device, accessing a home MCC list for the wireless communication device, determining whether the local MCC for the wireless communication device matches any home MCC comprised in the home MCC list for the wireless communication device, and modifying an operating parameter of the wireless communication device responsive to a determination that the local MCC for the wireless communication device does not match any home MCC comprised in the home MCC list for the wireless communication device.

One or more aspects of the subject disclosure include a non-transitory machine-readable medium, comprising executable instructions that, when executed by a processing system including a processor, facilitate performance of operations. The operations can include identifying a local MCC for a wireless communication device, accessing a home MCC list for the wireless communication device, determining whether the local MCC for the wireless communication device matches any home MCC comprised in the home MCC list for the wireless communication device, and modifying an operating parameter of the wireless communication device responsive to a determination that the local MCC for the wireless communication device does not match any home MCC comprised in the home MCC list for the wireless communication device.

One or more aspects of the subject disclosure include a method. The method can include identifying a local MCC for a wireless communication device, accessing a home MCC list for the wireless communication device, determining whether the local MCC for the wireless communication device matches any home MCC comprised in the home MCC list for the wireless communication device, and modifying an operating parameter of the wireless communication device responsive to a determination that the local MCC for the wireless communication device does not match any home MCC comprised in the home MCC list for the wireless communication device.

Referring now to FIG. 1, a block diagram is shown illustrating an example, non-limiting embodiment of a system 100 in accordance with various aspects described herein. For example, system 100 can facilitate in whole or in part identifying a local MCC for a wireless communication device, accessing a home MCC list for the wireless communication device, determining whether the local MCC for the wireless communication device matches any home MCC comprised in the home MCC list for the wireless communication device, and modifying an operating parameter of the wireless communication device responsive to a determination that the local MCC for the wireless communication device does not match any home MCC comprised in the home MCC list for the wireless communication device. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2:
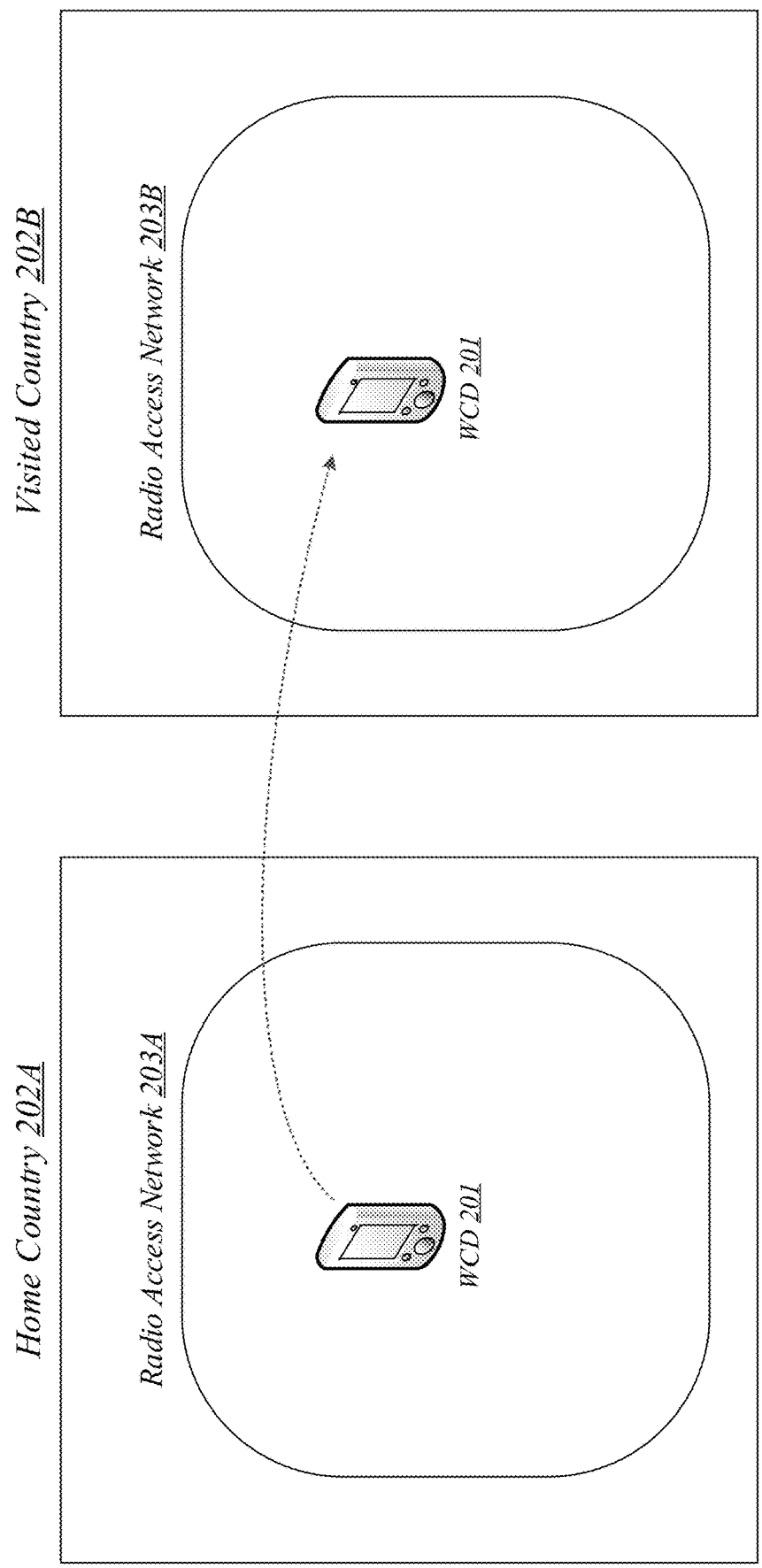
FIG. 2 is a block diagram illustrating an example, non-limiting embodiment of a first operating environment in accordance with various aspects described herein.

FIG. 2 is a block diagram illustrating an example of an operating environment 200 that may be representative of various embodiments. In operating environment 200, a wireless communication device (WCD) 201 initially operates within a radio access network (RAN) 203A located in a home country 202A of the wireless communication device 201. Various laws, regulations, rules, and/or requirements may apply within home country 202A that guide, and/or impose constraints upon, various aspects of the operations of wireless communication device 201. For example, within home country 202A, certain portions of spectrum may be licensed for use by cellular service providers, and other portions of spectrum may be designated as unlicensed spectrum that is available for public use. In such an embodiment, wireless communication device 201 may conduct wireless communications with radio access network 203A using portions of wireless bandwidth licensed to a cellular service provider operating radio access network 203A, and may conduct other wireless communications—such as wireless communications with a WiFi network—using portions of unlicensed spectrum designated by regulations of home country 202A.

As shown in FIG. 2, wireless communication device 201 may travel out of home country 202A into a visited country 202B, where wireless communication device 201 may operate within a radio access network 203B. Within visited country 202B, laws, regulations, rules, and/or requirements may apply that constrain operations of wireless communication devices in visited country 202B in ways in which such operations are not constrained within home country 202A. For example, bandwidth that constitutes unlicensed and publicly-usable spectrum in home country 202A may be licensed spectrum in visited country 202B, such that wireless communication devices in visited country 202B cannot use that bandwidth for WiFi communications in visited country 202B as they may within home country 202A. Additionally or alternatively, constraints that apply to operations of wireless communication devices in home country 202A may not apply to operations of wireless communication devices in visited country 202B. For example, regulations in visited country 202B may permit wireless transmissions with a transmit power greater than a maximum transmit power defined by regulations applicable in home country 202A. The embodiments are not limited to these examples.

Figure 3:
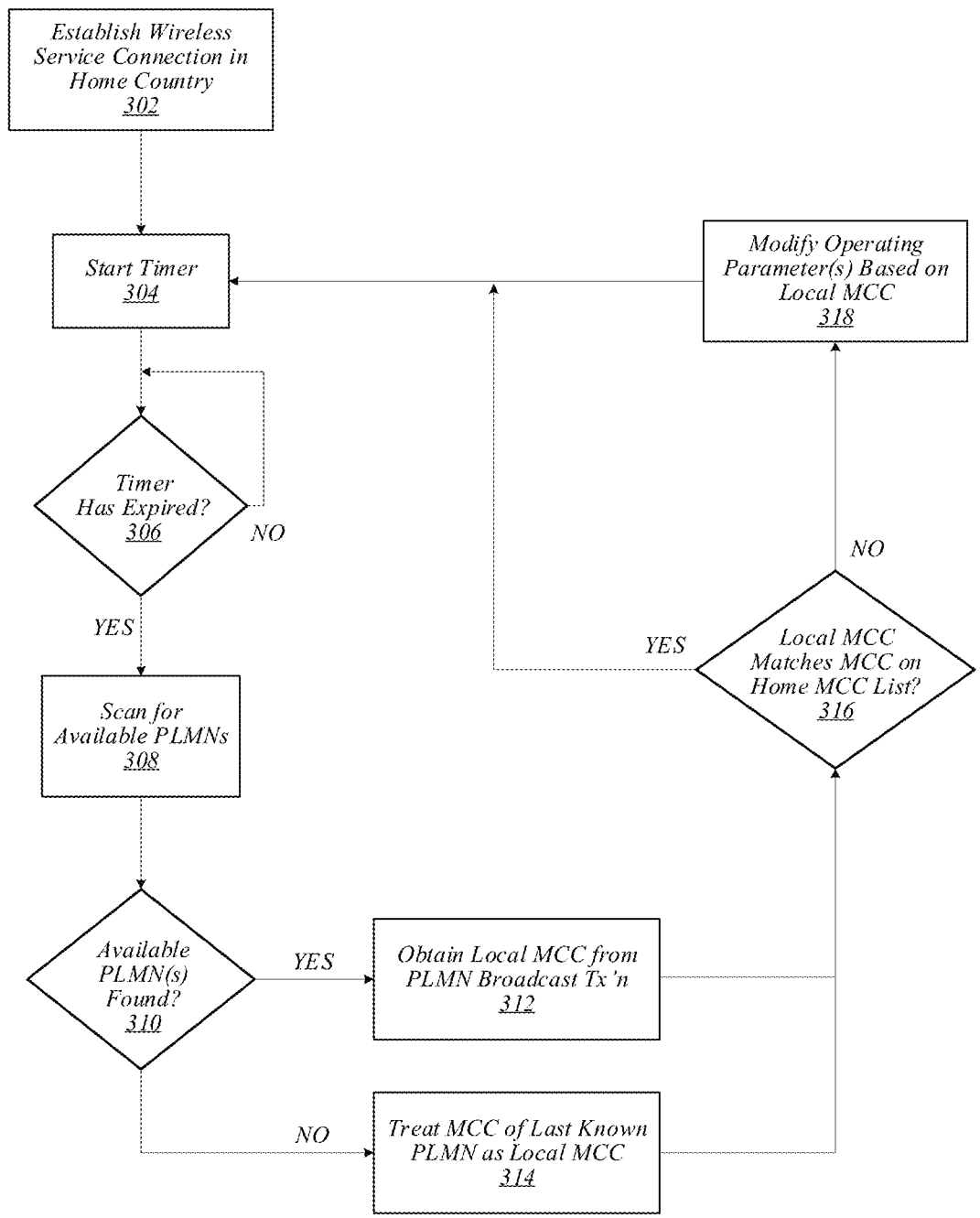
FIG. 3 is a block diagram illustrating an example, non-limiting embodiment of a procedure in accordance with various aspects described herein.

FIG. 3 is a block diagram illustrating an example of a procedure 300 for location-based adaptation of wireless communication device operating parameters. According to procedure 300, periodic checks may be performed to determine whether a wireless communication device has traveled outside of its home country, and operating parameter(s) of the wireless communication device may be modified responsive to a determination that the wireless communication device has done so. According to some embodiments, procedure 300 may be implemented in operating environment 200 of FIG. 2 in order to dynamically adapt operations of wireless communication device 201 as appropriate in order to comply with laws, regulations, rules, and/or requirements that apply within visited country 202B.

As shown in FIG. 3, procedure 300 may begin at 302, where a wireless communication device may establish a wireless service connection within its home country. For example, in operating environment 200 of FIG. 2, wireless communication device 201 may establish a wireless service connection within home country 202A via radio access network 203A, which may represent a home PLMN of wireless communication device 201. At 304, a timer may be started. Checks may be repeatedly performed at 306 to determine whether the timer has expired. Following detection at 306 that the timer has expired, flow may pass to 308, where a scan may be performed for available PLMNs. For example, upon expiration of a timer started at 304, wireless communication device 201 of FIG. 2 may scan for available PLMNs.

At 310, it may be determined whether any available PLMNs have been found. Depending on the outcome of this determination, the wireless communication device may identify a local MCC either at 312 or 314. If it is determined at 310 that at least one available PLMN has been found, flow may pass to 312, where the wireless communication device may identify the local MCC by obtaining it from a broadcast transmission of an available PLMN found at 308. For example, if the scan at 308 is performed after wireless communication device 201 has traveled to visited country 202B in operating environment 200 of FIG. 2, wireless communication device 201 may identify an MCC comprised in a broadcast transmission of radio access network 203B as the local MCC. If it is determined at 310 that no available PLMN has been found, flow may pass to 314, where the wireless communication device may identify an MCC of its last known PLMN as the local MCC. For example, if wireless communication device 201 has moved from within radio access network 203A to a location out of range of any PLMN in operating environment 200 of FIG. 2, then wireless communication device 201 may identify an MCC of radio access network 203 as the local MCC.

From either 312 or 314, flow may pass to 316, where it may be determined whether the local MCC matches any MCC on a home MCC list for the wireless communication device. For example, in operating environment 200 of FIG. 2, it may be determined whether the local MCC of wireless communication device 201 matches any MCC on a home MCC list of wireless communication device 201. If it is determined at 316 that the local MCC does not match any MCC on the home MCC list, flow may pass to 318. At 318, one or more operating parameters of the wireless communication device may be modified based on the local MCC. For example, responsive to a determination in operating environment 200 of FIG. 2 that its local MCC does not match any MCC on its home MCC list, wireless communication device 201 may modify one or more of its operating parameters based on the local MCC. Flow may then pass to 304, where a timer may once again be started in order to count down to the next check. If it is determined at 316 that the local MCC matches an MCC on the home MCC list, flow may pass directly to 304.

Figure 4:
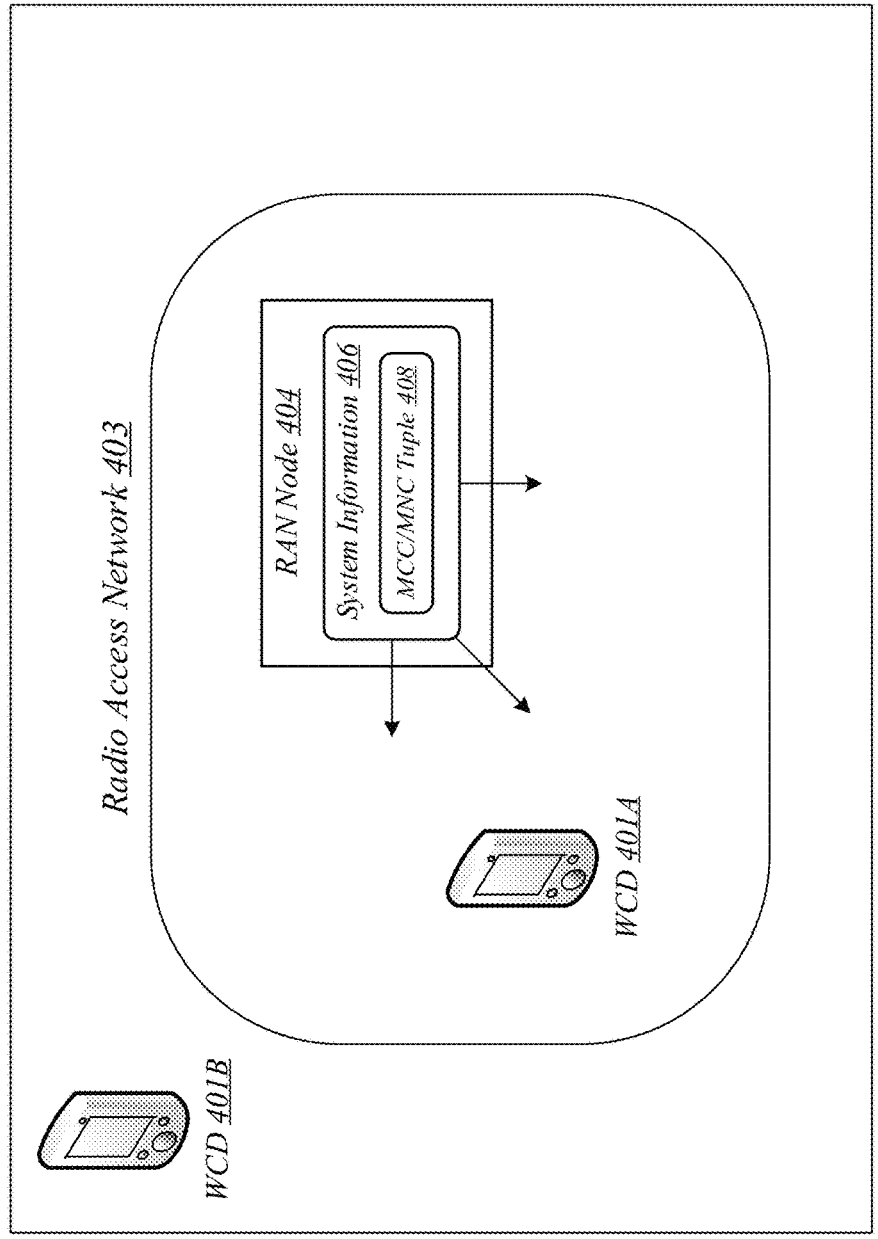
FIG. 4 is a block diagram illustrating an example, non-limiting embodiment of a second operating environment in accordance with various aspects described herein.

FIG. 4 is a block diagram illustrating an example of an operating environment 400 that may be representative of the implementation of the disclosed techniques for location-based adaptation of wireless communication device operating parameters according to various embodiments. In operating environment 400, wireless communication devices 401A and 401B are located within a country 402, and are both configured to perform periodic checks to determine whether they have traveled outside of their home countries, such as according to procedure 300 of FIG. 3. Wireless communication device 401A is located within range of a RAN node 404 of a radio access network 403 located within the country 402. Wireless communication device 401B is located outside range of radio access network 403. For the purposes of this discussion, it is assumed that radio access network 403 is the only PLMN located within country 402.

RAN node 404 can broadcast system information 406, which can include a mobile country code/mobile network code (MCC/MNC) tuple 408. An MCC/MNC tuple consists of an MCC-MNC pair that uniquely identifies a particular mobile network in a particular country. Thus, in this example, MCC/MNC tuple 408 will consist of an MCC-MNC pair that uniquely identifies radio access network 403. The MCC portion of MCC/MNC tuple 408 will comprise an MCC that corresponds to country 402. The MNC portion of MCC/MNC tuple 408 will comprise an MNC that identifies, in the particular country 402 designated by the MCC portion, the particular radio access network 403.

Since it is located within range of RAN node 404 of radio access network 403, wireless communication device 401A can receive system information 406 broadcast by RAN node 404. As such, when performing a check in conjunction with procedure 300 of FIG. 3, wireless communication device 401A can identify its local MCC by obtaining it from MCC/MNC tuple 408. In contrast, since it is not located within range of radio access network 403, wireless communication device 401B cannot identify its local MCC in this manner. Instead, wireless communication device 401B may identify an MCC of its last known PLMN as its local MCC. If wireless communication device 401B recently traveled from within coverage of radio access network 403 to its current position outside of that coverage, then its last known PLMN may be radio access network 403, and it may identify the MCC in MCC/MNC tuple 408 as its local MCC. On the other hand, if wireless communication device 401B recently traveled from outside of country 402 to its current position, then its last known PLMN may be a radio access network in another country, and it may identify an MCC associated with that PLMN as its local PLMN.

According to various embodiments, wireless communication devices 401A and/or 401B may be configured to determine whether or not they are located within their respective home countries by comparing their local MCCs to the MCC(s) include on their respective home MCC lists, and to selectively enable/disable device features/services accordingly. In some embodiments, for instance, wireless communication devices 401A and/or 401B may be configured to selectively enable/disable device-to-device (D2D)/ proximity services ("ProSe") communication services/features depending on whether they are located within their respective home countries. In an example embodiment, wireless communication device 401A may be configured such that it is capable of engaging in D2D communications when out of coverage within its home country, via a sidelink comprised of spectrum licensed—within its home country— to the operator of its home PLMN. Within country 402, that spectrum may be licensed to a different operator. Thus, wireless communication device 401A may be configured such that it refrains from D2D communications (or at least D2D communications via that spectrum) upon determining that it is located within country 402 rather than within its home country.

In some embodiments, wireless communication devices 401A and/or 401B may feature WiFi capabilities, and may be configured to selectively adapt aspects of their WiFi communications depending on whether they are located within their respective home countries. In an example embodiment, wireless communication device 401A may possess tethering capability, such that it can extend its cellular-based data connectivity to non-cellular devices via a WiFi network. WiFi channels that wireless communication device 401A can use to communicate with other devices of the WiFi network in conjunction with tethering operations in its home country may be unusable within country 402. Additionally or alternatively, a different allowable transmit power level may apply within country 402 than applies within the home country. Thus, wireless communication device 401A may be configured such that it uses different WiFi channel(s) for tethering and/or observes a different transmit power limit upon determining that it is located within country 402 rather than within its home country. The embodiments are not limited to these examples.

Figure 5:
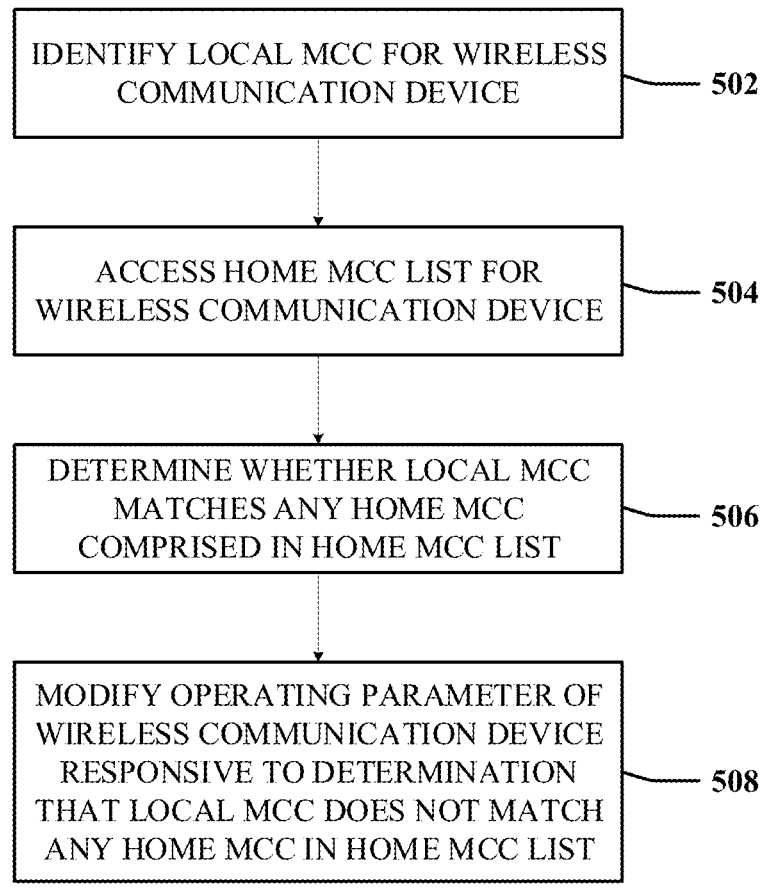
FIG. 5 depicts an illustrative embodiment of a method in accordance with various aspects described herein.

FIG. 5 depicts an illustrative embodiment of a method in accordance with various aspects described herein. While for purposes of simplicity of explanation, the respective processes are shown and described as a series of blocks in FIG. 5, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

As shown in FIG. 5, a local MCC for a wireless communication device may be identified at 502. At 504, a home MCC list for the wireless communication device may be accessed. At 506, it may be determined whether the local MCC identified at 502 matches any home MCC comprised in the home MCC list. At 508, responsive to a determination at 506 that the local MCC does not match any home MCC comprised in the home MCC list, one or more operating parameters of the wireless communication device may be modified.

Figure 6:
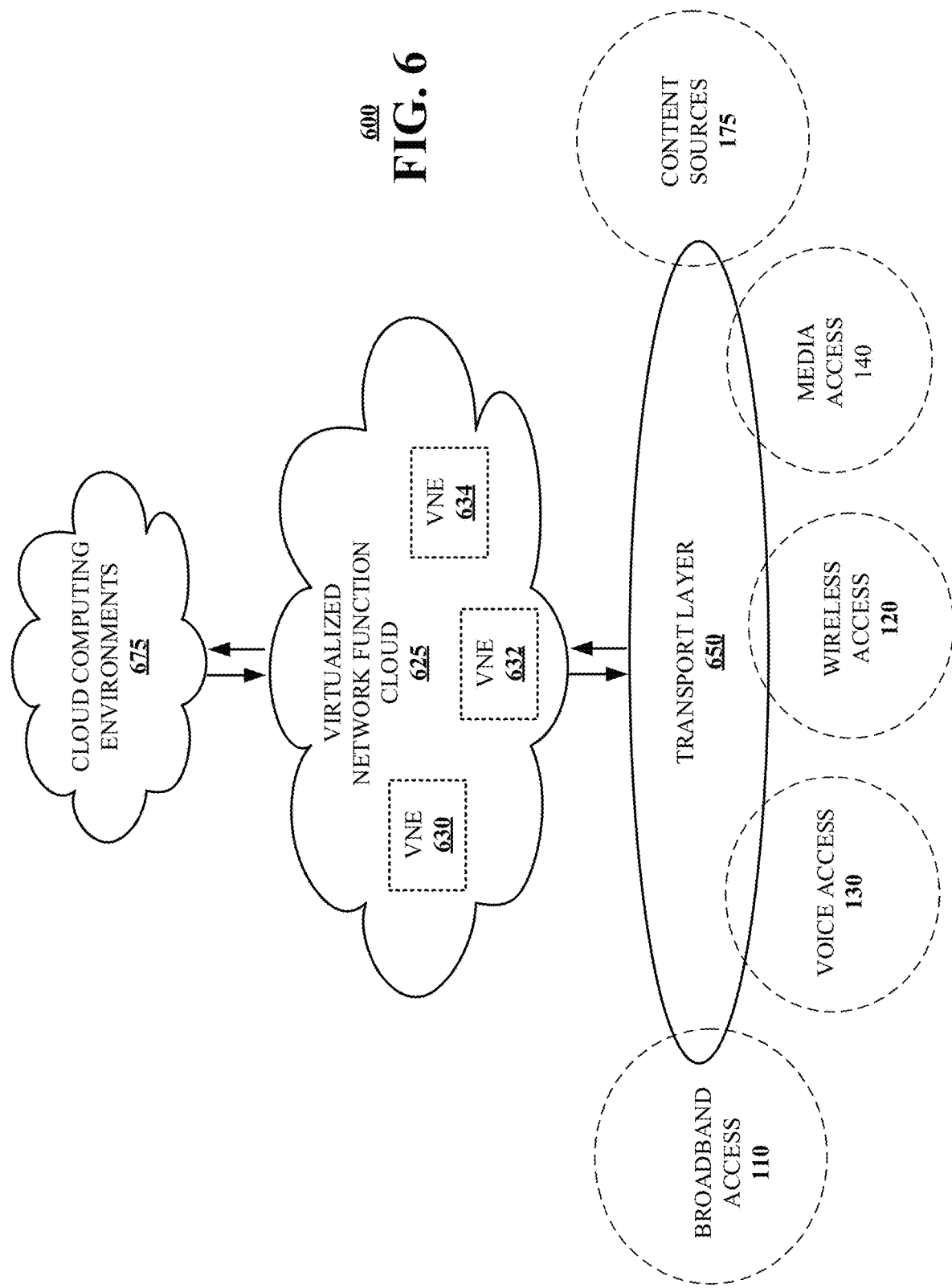
FIG. 6 is a block diagram illustrating an example, non-limiting embodiment of a virtualized communication network in accordance with various aspects described herein.

Referring now to FIG. 6, a block diagram 600 is shown illustrating an example, non-limiting embodiment of a virtualized communication network in accordance with various aspects described herein. In particular a virtualized communication network is presented that can be used to implement some or all of the subsystems and functions of system 100 of FIG. 1, RAN 203A or 203B of FIG. 2, procedure 300 of FIG. 3, or RAN 403 or RAN node 404 of FIG. 4. For example, virtualized communication network 600 can facilitate in whole or in part identifying a local MCC for a wireless communication device, accessing a home MCC list for the wireless communication device, determining whether the local MCC for the wireless communication device matches any home MCC comprised in the home MCC list for the wireless communication device, and modifying an operating parameter of the wireless communication device responsive to a determination that the local MCC for the wireless communication device does not match any home MCC comprised in the home MCC list for the wireless communication device.

In particular, a cloud networking architecture is shown that leverages cloud technologies and supports rapid innovation and scalability via a transport layer 650, a virtualized network function cloud 625 and/or one or more cloud computing environments 675. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 630, 632, 634, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 630 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 650 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 630, 632 or 634. These network elements can be included in transport layer 650.

The virtualized network function cloud 625 interfaces with the transport layer 650 to provide the VNEs 630, 632, 634, etc. to provide specific NFVs. In particular, the virtualized network function cloud 625 leverages cloud operations, applications, and architectures to support networking workloads. The virtualized network elements 630, 632 and 634 can employ network function software that provides either a one-for-one mapping of traditional network element function or alternately some combination of network functions designed for cloud computing. For example, VNEs 630, 632 and 634 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 630, 632, 634, etc. can be instantiated and managed using an orchestration approach similar to those used in cloud compute services.

The cloud computing environments 675 can interface with the virtualized network function cloud 625 via APIs that expose functional capabilities of the VNEs 630, 632, 634, etc. to provide the flexible and expanded capabilities to the virtualized network function cloud 625. In particular, network workloads may have applications distributed across the virtualized network function cloud 625 and cloud computing environment 675 and in the commercial cloud, or might simply orchestrate workloads supported entirely in NFV infrastructure from these third party locations.

Figure 7:
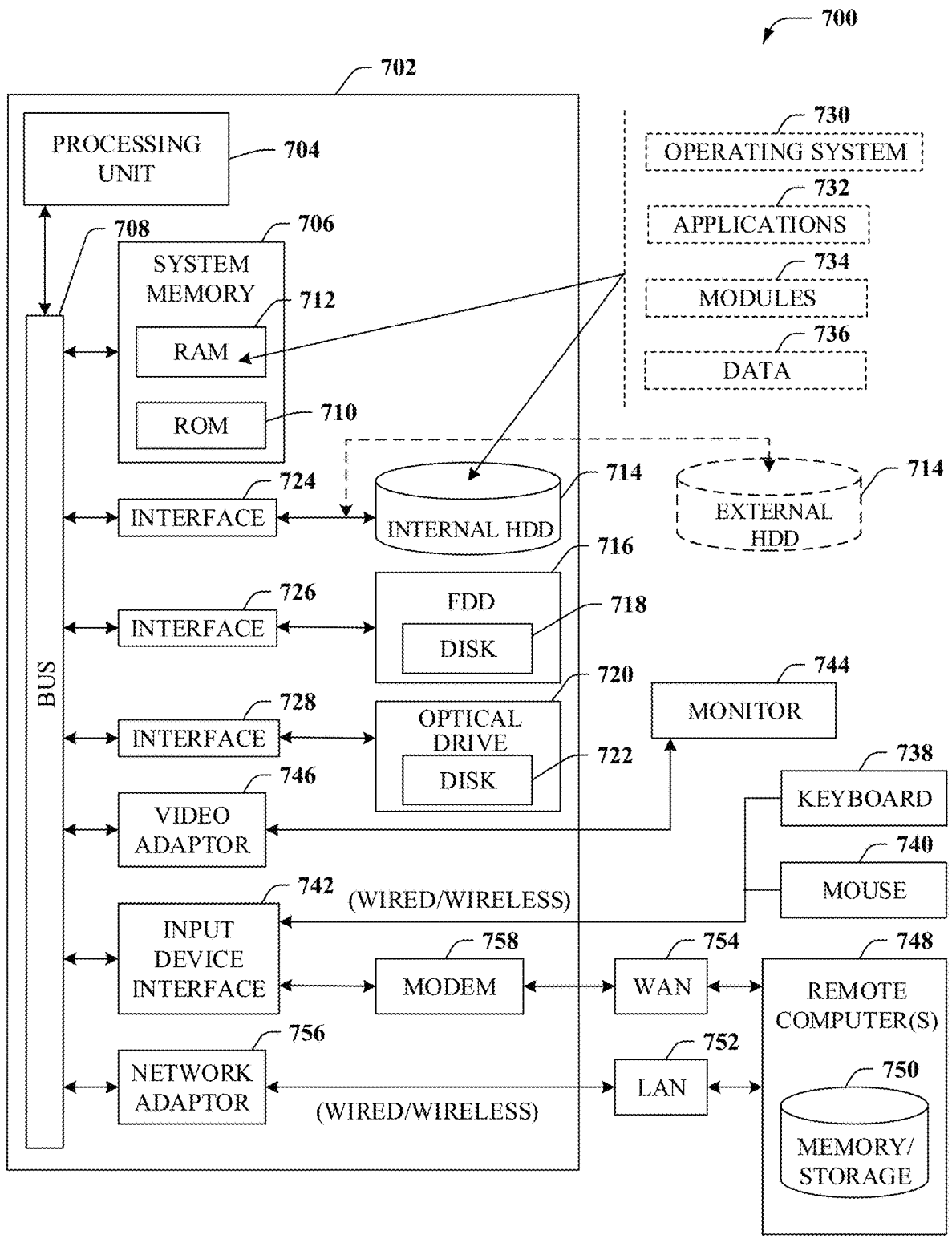
FIG. 7 is a block diagram of an example, non-limiting embodiment of a computing environment in accordance with various aspects described herein.

Turning now to FIG. 7, there is illustrated a block diagram of a computing environment in accordance with various aspects described herein. In order to provide additional context for various embodiments of the embodiments described herein, FIG. 7 and the following discussion are intended to provide a brief, general description of a suitable computing environment 700 in which the various embodiments of the subject disclosure can be implemented. In particular, computing environment 700 can be used in the implementation of network elements 150, 152, 154, 156, access terminal 112, base station or access point 122, switching device 132, media terminal 142, and/or VNEs 630, 632, 634, etc. Each of these devices can be implemented via computer-executable instructions that can run on one or more computers, and/or in combination with other program modules and/or as a combination of hardware and software. For example, computing environment 700 can facilitate in whole or in part identifying a local MCC for a wireless communication device, accessing a home MCC list for the wireless communication device, determining whether the local MCC for the wireless communication device matches any home MCC comprised in the home MCC list for the wireless communication device, and modifying an operating parameter of the wireless communication device responsive to a determination that the local MCC for the wireless communication device does not match any home MCC comprised in the home MCC list for the wireless communication device.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 7, the example environment can comprise a computer 702, the computer 702 comprising a processing unit 704, a system memory 706 and a system bus 708. The system bus 708 couples system components including, but not limited to, the system memory 706 to the processing unit 704. The processing unit 704 can be any of various commercially available processors. Dual microprocessors and other multiprocessor architectures can also be employed as the processing unit 704.

The system bus 708 can be any of several types of bus structure that can further interconnect to a memory bus (with or without a memory controller), a peripheral bus, and a local bus using any of a variety of commercially available bus architectures. The system memory 706 comprises ROM 710 and RAM 712. A basic input/output system (BIOS) can be stored in a non-volatile memory such as ROM, erasable programmable read only memory (EPROM), EEPROM, which BIOS contains the basic routines that help to transfer information between elements within the computer 702, such as during startup. The RAM 712 can also comprise a high-speed RAM such as static RAM for caching data.

The computer 702 further comprises an internal hard disk drive (HDD) 714 (e.g., EIDE, SATA), which internal HDD 714 can also be configured for external use in a suitable chassis (not shown), a magnetic floppy disk drive (FDD) 716, (e.g., to read from or write to a removable diskette 718) and an optical disk drive 720, (e.g., reading a CD-ROM disk 722 or, to read from or write to other high capacity optical media such as the DVD). The HDD 714, magnetic FDD 716 and optical disk drive 720 can be connected to the system bus 708 by a hard disk drive interface 724, a magnetic disk drive interface 726 and an optical drive interface 728, respectively. The hard disk drive interface 724 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 702, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 712, comprising an operating system 730, one or more application programs 732, other program modules 734 and program data 736. All or portions of the operating system, applications, modules, and/or data can also be cached in the RAM 712. The systems and methods described herein can be implemented utilizing various commercially available operating systems or combinations of operating systems.

A user can enter commands and information into the computer 702 through one or more wired/wireless input devices, e.g., a keyboard 738 and a pointing device, such as a mouse 740. Other input devices (not shown) can comprise a microphone, an infrared (IR) remote control, a joystick, a game pad, a stylus pen, touch screen or the like. These and other input devices are often connected to the processing unit 704 through an input device interface 742 that can be coupled to the system bus 708, but can be connected by other interfaces, such as a parallel port, an IEEE 1394 serial port, a game port, a universal serial bus (USB) port, an IR interface, etc.

A monitor 744 or other type of display device can be also connected to the system bus 708 via an interface, such as a video adapter 746. It will also be appreciated that in alternative embodiments, a monitor 744 can also be any display device (e.g., another computer having a display, a smart phone, a tablet computer, etc.) for receiving display information associated with computer 702 via any communication means, including via the Internet and cloud-based networks. In addition to the monitor 744, a computer typically comprises other peripheral output devices (not shown), such as speakers, printers, etc.

The computer 702 can operate in a networked environment using logical connections via wired and/or wireless communications to one or more remote computers, such as a remote computer(s) 748. The remote computer(s) 748 can be a workstation, a server computer, a router, a personal computer, portable computer, microprocessor-based entertainment appliance, a peer device or other common network node, and typically comprises many or all of the elements described relative to the computer 702, although, for purposes of brevity, only a remote memory/storage device 750 is illustrated. The logical connections depicted comprise wired/wireless connectivity to a local area network (LAN) 752 and/or larger networks, e.g., a wide area network (WAN) 754. Such LAN and WAN networking environments are commonplace in offices and companies, and facilitate enterprise-wide computer networks, such as intranets, all of which can connect to a global communications network, e.g., the Internet.

When used in a LAN networking environment, the computer 702 can be connected to the LAN 752 through a wired and/or wireless communication network interface or adapter 756. The adapter 756 can facilitate wired or wireless communication to the LAN 752, which can also comprise a wireless AP disposed thereon for communicating with the adapter 756.

When used in a WAN networking environment, the computer 702 can comprise a modem 758 or can be connected to a communications server on the WAN 754 or has other means for establishing communications over the WAN 754, such as by way of the Internet. The modem 758, which can be internal or external and a wired or wireless device, can be connected to the system bus 708 via the input device interface 742. In a networked environment, program modules depicted relative to the computer 702 or portions thereof, can be stored in the remote memory/storage device 750. It will be appreciated that the network connections shown are example and other means of establishing a communications link between the computers can be used.

The computer 702 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 8:
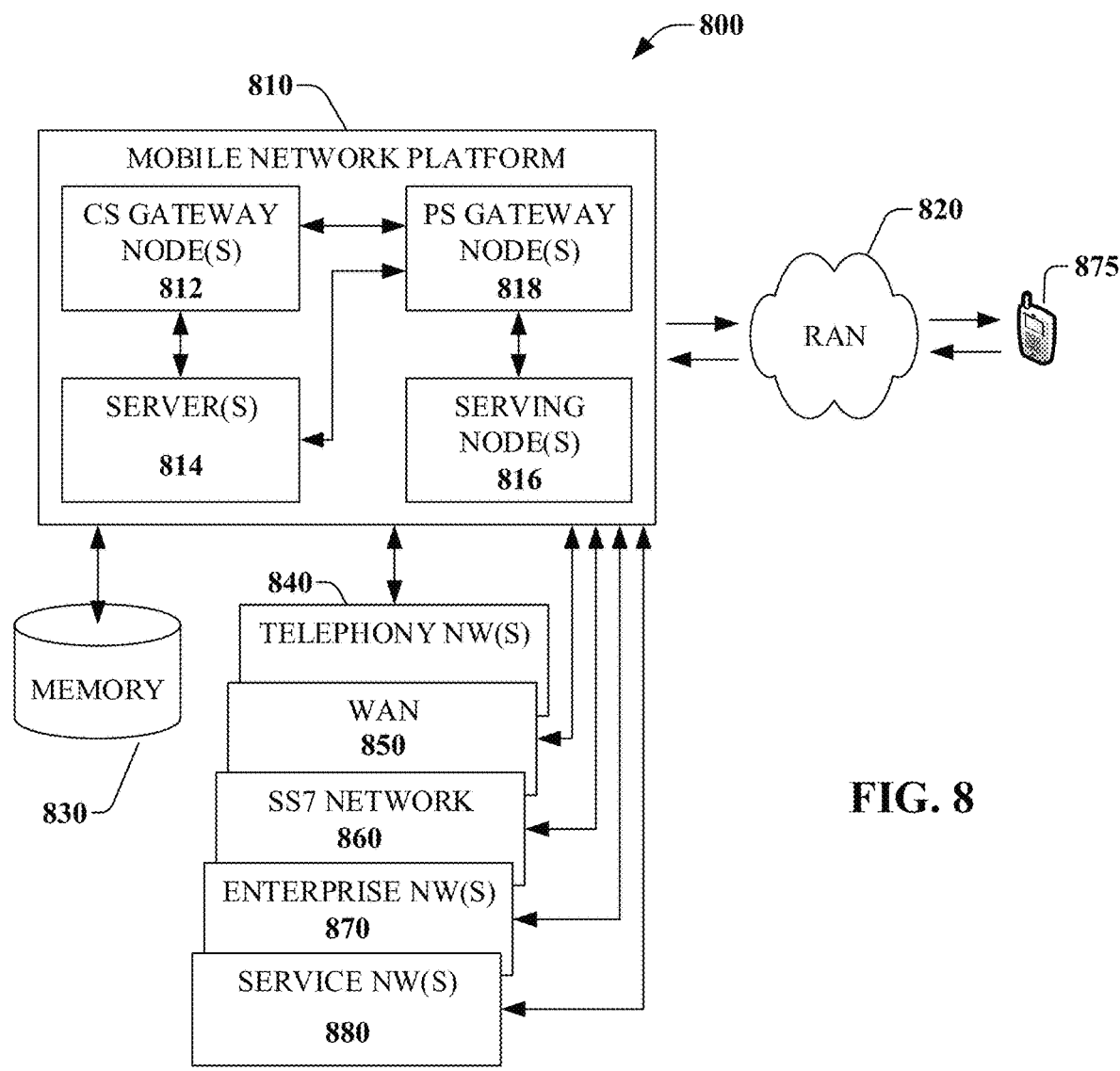
FIG. 8 is a block diagram of an example, non-limiting embodiment of a mobile network platform in accordance with various aspects described herein.

Turning now to FIG. 8, an embodiment 800 of a mobile network platform 810 is shown that is an example of network elements 150, 152, 154, 156, and/or VNEs 630, 632, 634, etc. For example, platform 810 can facilitate in whole or in part identifying a local MCC for a wireless communication device, accessing a home MCC list for the wireless communication device, determining whether the local MCC for the wireless communication device matches any home MCC comprised in the home MCC list for the wireless communication device, and modifying an operating parameter of the wireless communication device responsive to a determination that the local MCC for the wireless communication device does not match any home MCC comprised in the home MCC list for the wireless communication device. In one or more embodiments, the mobile network platform 810 can generate and receive signals transmitted and received by base stations or access points such as base station or access point 122. Generally, mobile network platform 810 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 810 can be included in telecommunications carrier networks, and can be considered carrier-side components as discussed elsewhere herein. Mobile network platform 810 comprises CS gateway node(s) 812 which can interface CS traffic received from legacy networks like telephony network(s) 840 (e.g., public switched telephone network (PSTN), or public land mobile network (PLMN)) or a signaling system #7 (SS7) network 860. CS gateway node(s) 812 can authorize and authenticate traffic (e.g., voice) arising from such networks. Additionally, CS gateway node(s) 812 can access mobility, or roaming, data generated through SS7 network 860; for instance, mobility data stored in a visited location register (VLR), which can reside in memory 830. Moreover, CS gateway node(s) 812 interfaces CS-based traffic and signaling and PS gateway node(s) 818. As an example, in a 3GPP UMTS network, CS gateway node(s) 812 can be realized at least in part in gateway GPRS support node(s) (GGSN). It should be appreciated that functionality and specific operation of CS gateway node(s) 812, PS gateway node(s) 818, and serving node(s) 816, is provided and dictated by radio technology(ies) utilized by mobile network platform 810 for telecommunication over a radio access network 820 with other devices, such as a radiotelephone 875.

In addition to receiving and processing CS-switched traffic and signaling, PS gateway node(s) 818 can authorize and authenticate PS-based data sessions with served mobile devices. Data sessions can comprise traffic, or content(s), exchanged with networks external to the mobile network platform 810, like wide area network(s) (WANs) 850, enterprise network(s) 870, and service network(s) 880, which can be embodied in local area network(s) (LANs), can also be interfaced with mobile network platform 810 through PS gateway node(s) 818. It is to be noted that WANs 850 and enterprise network(s) 870 can embody, at least in part, a service network(s) like IP multimedia subsystem (IMS). Based on radio technology layer(s) available in technology resource(s) or radio access network 820, PS gateway node(s) 818 can generate packet data protocol contexts when a data session is established; other data structures that facilitate routing of packetized data also can be generated. To that end, in an aspect, PS gateway node(s) 818 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 800, mobile network platform 810 also comprises serving node(s) 816 that, based upon available radio technology layer(s) within technology resource(s) in the radio access network 820, convey the various packetized flows of data streams received through PS gateway node(s) 818. It is to be noted that for technology resource(s) that rely primarily on CS communication, server node(s) can deliver traffic without reliance on PS gateway node(s) 818; for example, server node(s) can embody at least in part a mobile switching center. As an example, in a 3GPP UMTS network, serving node(s) 816 can be embodied in serving GPRS support node(s) (SGSN).

For radio technologies that exploit packetized communication, server(s) 814 in mobile network platform 810 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 810. Data streams (e.g., content(s)) that are part of a voice call or data session can be conveyed to PS gateway node(s) 818 for authorization/authentication and initiation of a data session, and to serving node(s) 816 for communication thereafter. In addition to application server, server(s) 814 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 810 to ensure network's operation and data integrity in addition to authorization and authentication procedures that CS gateway node(s) 812 and PS gateway node(s) 818 can enact. Moreover, provisioning server(s) can provision services from external network(s) like networks operated by a disparate service provider; for instance, WAN 850 or Global Positioning System (GPS) network(s) (not shown). Provisioning server(s) can also provision coverage through networks associated to mobile network platform 810 (e.g., deployed and operated by the same service provider), such as the distributed antennas networks shown in FIG. 1(s) that enhance wireless service coverage by providing more network coverage.

It is to be noted that server(s) 814 can comprise one or more processors configured to confer at least in part the functionality of mobile network platform 810. To that end, the one or more processor can execute code instructions stored in memory 830, for example. It is should be appreciated that server(s) 814 can comprise a content manager, which operates in substantially the same manner as described hereinbefore.

In example embodiment 800, memory 830 can store information related to operation of mobile network platform 810. Other operational information can comprise provisioning information of mobile devices served through mobile network platform 810, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 830 can also store information from at least one of telephony network(s) 840, WAN 850, SS7 network 860, or enterprise network(s) 870. In an aspect, memory 830 can be, for example, accessed as part of a data store component or as a remotely connected memory store.

In order to provide a context for the various aspects of the disclosed subject matter, FIG. 8, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 9:
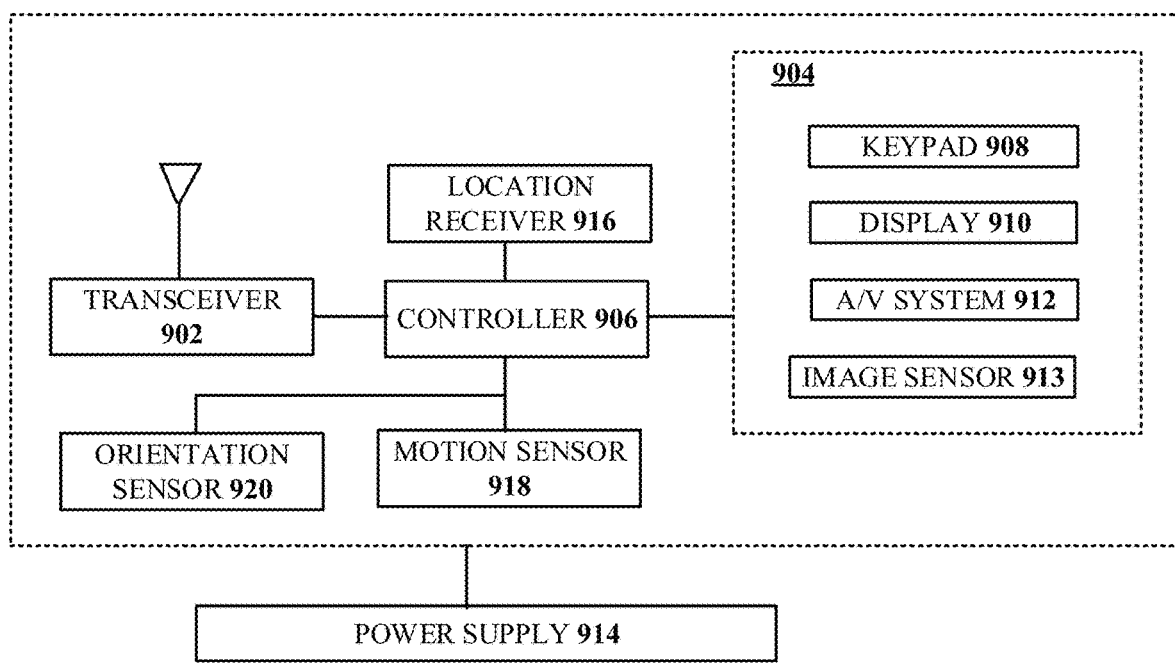
FIG. 9 is a block diagram of an example, non-limiting embodiment of a communication device in accordance with various aspects described herein.

Turning now to FIG. 9, an illustrative embodiment of a communication device 900 is shown. The communication device 900 can serve as an illustrative embodiment of devices such as data terminals 114, mobile devices 124, vehicle 126, display devices 144 or other client devices for communication via either communications network 125. For example, computing device 900 can facilitate in whole or in part identifying a local MCC for a wireless communication device, accessing a home MCC list for the wireless communication device, determining whether the local MCC for the wireless communication device matches any home MCC comprised in the home MCC list for the wireless communication device, and modifying an operating parameter of the wireless communication device responsive to a determination that the local MCC for the wireless communication device does not match any home MCC comprised in the home MCC list for the wireless communication device.

The communication device 900 can comprise a wireline and/or wireless transceiver 902 (herein transceiver 902), a user interface (UI) 904, a power supply 914, a location receiver 916, a motion sensor 918, an orientation sensor 920, and a controller 906 for managing operations thereof. The transceiver 902 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 902 can also be adapted to support circuit-switched wireline access technologies (such as PSTN), packet-switched wireline access technologies (such as TCP/IP, VoIP, etc.), and combinations thereof.

The UI 904 can include a depressible or touch-sensitive keypad 908 with a navigation mechanism such as a roller ball, a joystick, a mouse, or a navigation disk for manipulating operations of the communication device 900. The keypad 908 can be an integral part of a housing assembly of the communication device 900 or an independent device operably coupled thereto by a tethered wireline interface (such as a USB cable) or a wireless interface supporting for example Bluetooth®. The keypad 908 can represent a numeric keypad commonly used by phones, and/or a QWERTY keypad with alphanumeric keys. The UI 904 can further include a display 910 such as monochrome or color LCD (Liquid Crystal Display), OLED (Organic Light Emitting Diode) or other suitable display technology for conveying images to an end user of the communication device 900. In an embodiment where the display 910 is touch-sensitive, a portion or all of the keypad 908 can be presented by way of the display 910 with navigation features.

The display 910 can use touch screen technology to also serve as a user interface for detecting user input. As a touch screen display, the communication device 900 can be adapted to present a user interface having graphical user interface (GUI) elements that can be selected by a user with a touch of a finger. The display 910 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 910 can be an integral part of the housing assembly of the communication device 900 or an independent device communicatively coupled thereto by a tethered wireline interface (such as a cable) or a wireless interface.

The UI 904 can also include an audio system 912 that utilizes audio technology for conveying low volume audio (such as audio heard in proximity of a human ear) and high volume audio (such as speakerphone for hands free operation). The audio system 912 can further include a microphone for receiving audible signals of an end user. The audio system 912 can also be used for voice recognition applications. The UI 904 can further include an image sensor 913 such as a charged coupled device (CCD) camera for capturing still or moving images.

The power supply 914 can utilize common power management technologies such as replaceable and rechargeable batteries, supply regulation technologies, and/or charging system technologies for supplying energy to the components of the communication device 900 to facilitate long-range or short-range portable communications. Alternatively, or in combination, the charging system can utilize external power sources such as DC power supplied over a physical interface such as a USB port or other suitable tethering technologies.

The location receiver 916 can utilize location technology such as a global positioning system (GPS) receiver capable of assisted GPS for identifying a location of the communication device 900 based on signals generated by a constellation of GPS satellites, which can be used for facilitating location services such as navigation. The motion sensor 918 can utilize motion sensing technology such as an accelerometer, a gyroscope, or other suitable motion sensing technology to detect motion of the communication device 900 in three-dimensional space. The orientation sensor 920 can utilize orientation sensing technology such as a magnetometer to detect the orientation of the communication device 900 (north, south, west, and east, as well as combined orientations in degrees, minutes, or other suitable orientation metrics).

The communication device 900 can use the transceiver 902 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 906 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 900.

Other components not shown in FIG. 9 can be used in one or more embodiments of the subject disclosure. For instance, the communication device 900 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)=confidence$ (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A wireless communication device, comprising:
   a processing system including a processor; and
   a memory that stores executable instructions that, when executed by the processing system, facilitate performance of operations, the operations comprising:
   identifying a local mobile country code (MCC) for the wireless communication device, wherein the identifying the local MCC for the wireless communication device comprises, without connecting to a radio access network (RAN), obtaining the local MCC from a broadcast transmission of the RAN;
   accessing a home MCC list for the wireless communication device, wherein the home MCC list comprises a list of one or more home MCCs of the wireless communication device;
   determining whether the local MCC for the wireless communication device matches any of the one or more home MCCs in the home MCC list;
   modifying an operating parameter of the wireless communication device responsive to a determination that the local MCC for the wireless communication device does not match any home MCC in the home MCC list and that the wireless communication device is located in a different country that is outside of coverage of a home country of the wireless communication device; and
   engaging in device-to-device proximity services using the operating parameter having been modified responsive to the determination that the local MCC for the wireless communication device does not match any home MCC in the home MCC list and that the wireless communication device is located in the different country, the modifying the operating parameter of the wireless communication device causing the wireless communication device to refrain from communicating over a radio frequency band used for sidelink communications that is licensed within the home country to an operator of a home public land mobile network (PLMN) of the wireless communication device and conduct sidelink communications via a radio frequency band used for sidelink communications that is licensed outside the home country to an operator different than the operator of the home PLMN of the wireless communication device.

2. The wireless communication device of claim 1, wherein the operations further comprise identifying an MCC associated with a current serving public land mobile network (PLMN) of the device as the local MCC for the wireless communication device.

3. The wireless communication device of claim 1, wherein the modifying the operating parameter of the wireless communication device comprises disabling a feature of the wireless communication device.

4. The wireless communication device of claim 1, wherein the modifying the operating parameter of the wireless communication device comprises blocking usage of a service by the wireless communication device.

5. The wireless communication device of claim 1, wherein the wireless communication device is configured to use the radio frequency band for sidelink communications while located within the home PLMN of the wireless communication device.

6. A non-transitory machine-readable medium, comprising executable instructions that, when executed by a processing system including a processor, facilitate performance of operations, the operations comprising:
   identifying a mobile country code (MCC) associated with a current position of a wireless communication device, wherein the identifying the MCC associated with the current position of the wireless communication device comprises, without connecting to a radio access network (RAN), obtaining the MCC from a broadcast transmission of the RAN;
   accessing a home MCC list for the wireless communication device, wherein the home MCC list comprises a list of one or more home MCCs of the wireless communication device;
   determining whether the MCC associated with the current position of the wireless communication device matches any of the one or more home MCCs in the home MCC list;
   responsive to a determination that no MCC in the home MCC list matches the MCC associated with the current position of the wireless communication device and that the wireless communication device is located in a different country that is outside of coverage of a home country of the wireless communication device, modifying an operating parameter of the wireless communication device; and
   engaging in device-to-device proximity services using the operating parameter having been modified responsive to the determination that no MCC in the home MCC list matches the MCC associated with the current position of the wireless communication device and that the wireless communication device is located in the different country, the modifying the operating parameter of the wireless communication device causing the wireless communication device to refrain from communicating over a radio frequency band used for sidelink communications that is licensed within the home country to an operator of a home public land mobile network (PLMN) of the wireless communication device and conduct sidelink communications via a radio frequency band used for sidelink communications that is licensed outside the home country to an operator different than the operator of the home PLMN of the wireless communication device.

7. The non-transitory machine-readable medium of claim 6, wherein the operations further comprise identifying an MCC associated with a current serving public land mobile network (PLMN) of the wireless communication device as the MCC associated with the current position of the wireless communication device.

8. The non-transitory machine-readable medium of claim 6, wherein the modifying the operating parameter of the wireless communication device comprises disabling a feature of the wireless communication device.

9. The non-transitory machine-readable medium of claim 6, wherein the modifying the operating parameter of the wireless communication device comprises blocking usage of a service by the wireless communication device.

10. The non-transitory machine-readable medium of claim 6, wherein the wireless communication device is configured to use the radio frequency band for sidelink communications while located within the home PLMN of the wireless communication device.

11. A method comprising:
Identifying, by a processing system comprising a processor, a mobile country code (MCC) associated with a current position of a wireless communication device, wherein the identifying the MCC associated with the current position of the wireless communication device comprises, without connecting to a radio access network (RAN), obtaining the MCC from a broadcast transmission of the RAN:
accessing, by the processing system, a home MCC list for the wireless communication device, wherein the home MCC list comprises a list of one or more home MCCs of the wireless communication device;
determining, by the processing system, whether the MCC associated with the current position of the wireless communication device matches any of the one or more home MCCs in the home MCC list;

responsive to a determination, by the processing system, that no MCC in the home MCC list matches the MCC associated with the current position of the wireless communication device and that the wireless communication device is located in a different country that is outside of coverage of a home country of the wireless communication device, modifying, by the processing system, an operating parameter of the wireless communication device; and
engaging, by the processing system, in device-to-device proximity services using the operating parameter having been modified responsive to the determination that no MCC in the home MCC list matches the MCC associated with the current position of the wireless communication device and that the wireless communication device is located in the different country, the modifying the operating parameter of the wireless communication device causing the wireless communication device to refrain from communicating over a radio frequency band used for sidelink communications that is licensed within the home country to an operator of a home public land mobile network (PLMN) of the wireless communication device and conduct sidelink communications via a radio frequency band used for sidelink communications that is licensed outside the home country to an operator different than the operator of the home PLMN of the wireless communication device.

12. The method of claim 11, comprising identifying an MCC associated with a current serving public land mobile network (PLMN) of the wireless communication device as the MCC associated with the current position of the wireless communication device.

13. The method of claim 11, wherein the modifying the operating parameter of the wireless communication device comprises disabling a feature of the wireless communication device.

14. The method of claim 11, wherein the modifying the operating parameter of the wireless communication device comprises blocking usage of a service by the wireless communication device.

15. The method of claim 11, wherein the wireless communication device is configured to use the radio frequency band for sidelink communications while located within the home PLMN of the wireless communication device, wherein the method further comprises causing the wireless communication device to conduct sidelink communications via unlicensed spectrum.

* * * * *